Dec. 22, 1936. K. S. CLAPP 2,065,429
VAPOR RECOVERY SYSTEM
Filed June 24, 1935 2 Sheets-Sheet 1
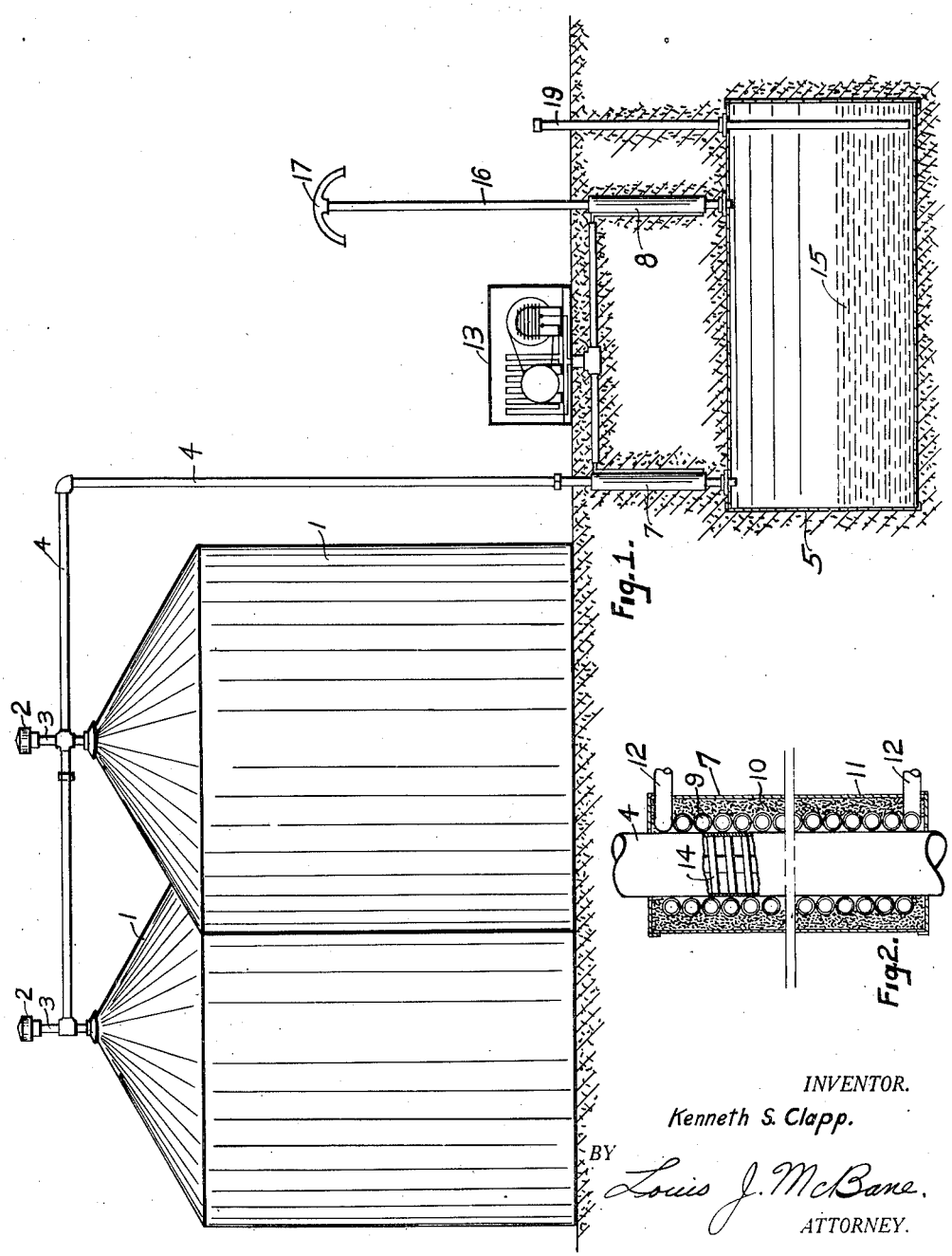
INVENTOR.
Kenneth S. Clapp.
BY
Louis J. McBane.
ATTORNEY.

Patented Dec. 22, 1936

2,065,429

UNITED STATES PATENT OFFICE 2,065,429

VAPOR RECOVERY SYSTEM

Kenneth S. Clapp, Shaker Heights, Ohio

Application June 24, 1935, Serial No. 28,049

8 Claims. (Cl. 62—122)

This invention relates to the recovery of vapors discharged by petroleum products, such as gasoline, or other volatile liquids, when held in storage tanks.

Vapor is always present in the space within a storage tank above the liquid level. Changes in atmospheric temperature increase and decrease the quantity of vapor and cause the vapor to expand and contract, within the vapor space of a tank. Agitation, caused by liquid being added to the tank, increases the quantity of vapor and the diminishing head space increases the vapor pressure. These conditions result in great loss to the petroleum industry since the excess vapors are allowed to escape to the atmosphere to relieve the pressure on the storage tanks.

Fluctuations in vapor pressure must be taken into consideration. For example, an overnight change in temperature from 60° F. to 100° F. results in an increase of approximately 100% in the vapor pressure, which, if not relieved, would burst the storage tank. It is desirable to relieve fluctuations in vapor pressure without substantial loss of the vapor or liquid in storage. The prevailing method is to relieve fluctuations in pressure by venting the storage tank to the atmosphere at all times; this involves the loss of a considerable quantity of vapor which should be recovered. For instance, there is from three to six cubic inches of liquid gasoline, in the form of vapor, in each cubic foot of vapor space above the liquid level, depending on temperature, which is lost by venting the storage tank to the atmosphere. A system has been perfected for recovering vapor escaping from storage tanks; a system which also permits discharge of vapors from the vapor space of a tank and permits ingress of air into the vapor space, this action commonly being termed breathing, in the trade. Such a system is disclosed in my Patent No. 1,979,451 issued November 6, 1934.

It is an object of this invention to provide a device for recovering vapor escaping from storage tanks containing gasoline, or other volatile liquids. Another object of this invention is to provide a device both for recovering escaping vapor and for permitting the storage tank to breathe. It is an object of this invention to improve the device disclosed and claimed in my patent, aforementioned. Another object of this invention is to provide refrigerating means, useful in combination with the device of my patent, aforementioned, for effecting greater recovery of vapors escaping from storage tanks containing petroleum products, or other volatile liquids.

Other objects and advantages of the present invention will appear in the following detailed description taken in connection with the accompanying drawings, in which:

Figure 1 is a view, partly in elevation and partly in section, illustrating a combination embodying this invention.

Figure 2 is a view, in cross-section, illustrating refrigerating means forming part of the combination shown in Figure 1.

Figure 3:
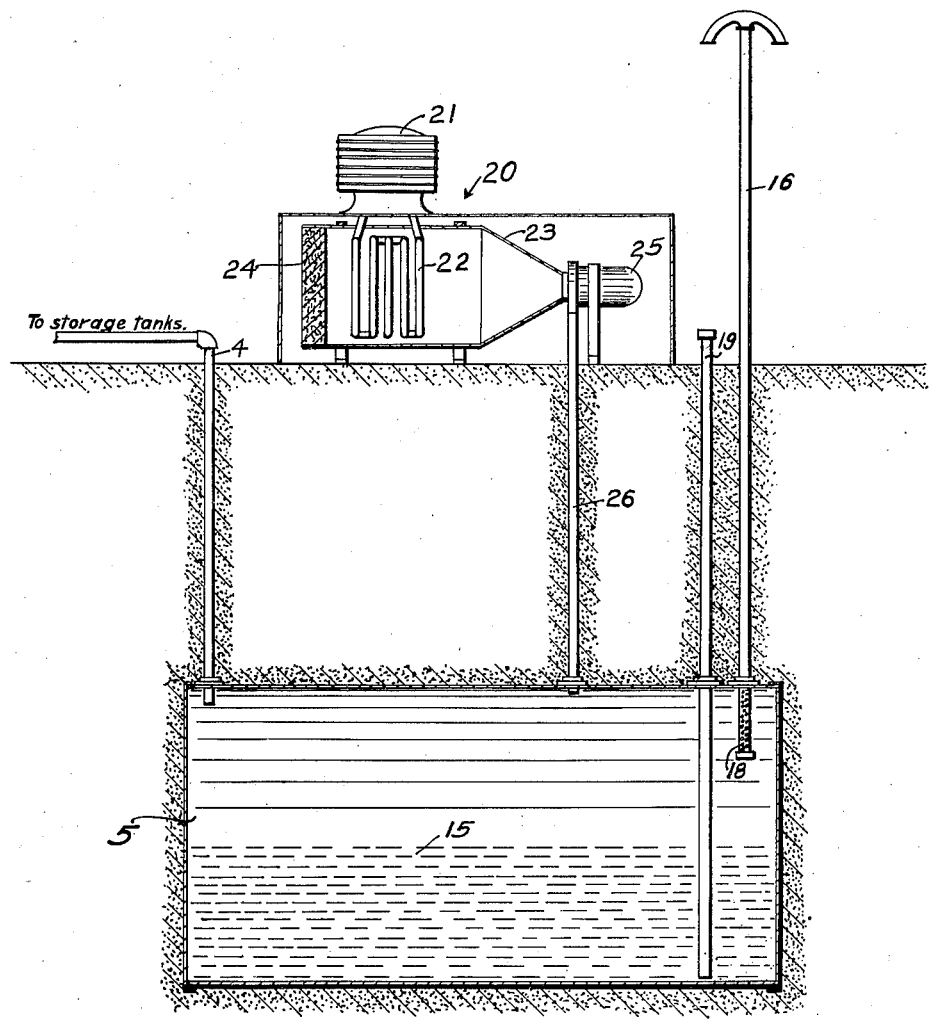
Figure 3 is a view, in cross-section, illustrating a modified form of my invention.

As shown in Figure 1, tanks 1 are the conventional type for storage of petroleum products, such as gasoline; they are provided with the usual means (not shown) for filling, and are equipped with valves 2 connected therewith by piping 3 at a high point always accessible to the vapors within the tanks. The valves 2 are conventional in construction and operate to open by the action of either pressure or vacuum within the vapor space in the storage tank.

Ordinary fluctuations in pressure within the tanks 1 are relieved by the flow of vapor and air through the conduit 4. The conduit 4 connects with the tanks 1 at any convenient place, accessible, at all times, to the vapor space within the tanks. It is suitable to join the conduit 4 with the piping 3, as shown in Figure 1. Any desired number of tanks may be served by one conduit 4, within practicable limits.

Expansion of the vapor with rising temperature and/or increasing vapor pressure due to liquid agitation and decreasing head space, cause vapor to discharge through the conduit 4. The discharging vapor is recovered and collected by condensing it and retaining the condensate in a suitable container 5. The conduit 4 is connected to the container 5.

The container 5 affords space for retaining the condensate. As shown in Figure 1, the container 5 is arranged underground. The subterranean container 5 is placed far enough beneath the surface of the ground that it will have at least a fairly uniform temperature regardless of seasonal changes in temperature and weather. Such a subterranean container remains at a comparatively cool temperature even during summer weather. The vapors entering the container 5 are condensed, in part, at the lower temperature which obtains therein, due to its subterranean location. This condensation affords a satisfactory means for recovering a part of the discharging vapors. However, the condensing action of the subterranean container may be improved upon, in worthwhile measure, by refrigerating means in combination therewith which insures substantially complete recovery of vapors at all times, which is effective when vapor is discharging rapidly, with rapidly rising temperatures and when the storage tanks are being filled.

The container 5 may be submerged in water, instead of being underground, where such an arrangement is convenient. By arranging the container 5 at a level where the water is substantially constant in temperature, the conditions equivalent to those obtaining for the subterranean arrangement of the container are provided. In this specification and in the claims defining this invention, the term "subterranean" is intended to include a container submerged in water, as well as a container arranged underground.

In general, a temperature about 40° F. to 45° F. below that obtaining in the vapor space of a storage tank is adequate and desirable for effecting substantially complete condensation of the vapor. In warm weather, the temperature within the container 5, due to its subterranean location, may be lower than atmospheric temperature to an extent sufficient to effect substantially complete condensation of the vapor. However, in cool weather the difference between the temperature within the container 5 and atmospheric temperature may be small, and, in cold weather, the atmospheric temperature may be lower than that within container 5. Under these conditions the container 5 does not effect condensation of vapor in adequate measure. The losses incurred by escaping vapor are much smaller in cool and cold weather than in warm weather, when no effort is made to conserve the vapor, yet the losses in cool and cold weather are sufficiently great that it is commercially practicable to recover those vapors.

In order effectively to recover escaping vapors at all seasons of the year, means which will operate to maintain a condensing region at a temperature well below, 40° F. to 45° F. for example, the atmospheric temperature, should be provided. Refrigerating means of various types, operating in various ways to provide cooling regions for vapors, and arranged in various combinations with the other elements of the vapor recovery system herein disclosed, may be used, according to this invention, for effecting condensation of escaping vapors.

One form of refrigerating means is illustrated at 7 and 8, in Figure 1. The refrigerating means may be associated with the subterranean container 5 in a variety of ways, within the purview of this invention, the essential factor in the relation therebetween being that the refrigerating means is arranged in good heat transfer relation to vapors entering, in and/or leaving the container. As shown in Figure 1, the refrigerating means 7 is arranged in good heat transfer relation to vapors discharging from the storage tanks 1 and entering the subterranean container 5. The refrigerating means operates by extracting heat from the vapor, lowering its temperature, and causing condensation. The condensate collects in container 5.

As shown in Figure 2, the refrigerating means 7 consists of a refrigerant or refrigerating element 9. The refrigerant or element 9 may take various forms and may be arranged in good heat transfer relation to vapor passing through conduit 4 in a variety of ways, within the purview of this invention. As shown in Figure 2, it is convenient and practicable to arrange the element 9 as a coil of tubing around the conduit 4 and in contact with the conduit. The tubing affords passage for refrigerating fluid and the metal to metal contact with the conduit affords good heat transfer from within the conduit. As shown in Figure 1, it is desirable to arrange the refrigerating means 7 underground where it is protected. If desired, insulation may be provided as shown at 10, Figure 2, a casing 11 being provided for containing it. The insulation 10 may be asbestos fibre, mineral wool, or any other well known material suitable for such use. Tubing 12 extends from the coil to a mechanical refrigeration unit 13, Figure 1, of conventional design and construction. Operation of the unit 13 causes refrigerating fluid to flow through the refrigerating element 9, thus cooling and condensing vapors within the conduit 4 at the region within the refrigerating element, or beyond in the direction of flow of the vapor in the conduit.

The transfer of heat from the vapor occurs through the wall of the conduit 4 and, to insure good transfer, the vapor should be brought into good contact with the inner wall of the conduit 4 and the flow of vapor should be slow enough to allow adequate time for the transfer of heat. Suitable baffling means may be arranged in the conduit 4, at the region within the refrigerating element 9, to direct the flow of vapor through the conduit into contact with the conduit wall and to impede the flow of vapor to allow sufficient time for heat transfer. Various baffling means may be utilized to effect those functions, a screw 14 closely fitting within the conduit, as shown in Figure 2, being one suitable means. The vapor follows the track between the threads and makes good and complete contact with the conduit wall. The passage between the threads is relatively long and small so as to impede the flow of vapor to allow time for heat transfer. This baffling means also serves to retard fluctuations in pressure and flow of the vapor so that the whole system for condensing and conserving the escaping vapors operates more effectively.

Alternatively, a suitable baffling means may be attached to the end of the conduit 4 in the container 5.

While the use of such baffles is desirable, this invention may be practised without baffling means of any kind, or with a conventional pressure and vacuum relief valve installed in place of the open head 17 on the vent 16, later to be described, for container 5.

While the refrigerant 9 is effective and a practicable construction, other forms of refrigerant may be utilized, according to this invention. For example, a standpipe may be arranged underground in a vertical position with one end available at the surface of the ground, and with the conduit 4 passing centrally through it. Ice may be placed in the standpipe from time to time to cool the vapor passing through the conduit.

Condensed vapors collect in the container 5 as indicated at 15. A vent pipe 16 is connected with the container 5 and opens to the atmosphere through outlet 17. The lower end of the vent 16 may be perforated, if desired, as indicated at 18, in Figure 3, to retard the flow of vapor thereinto, although this is not essential. It is important that both the conduit 4 and the vent 16 open into, or have openings into, the container 5 at regions close to the top of the container so that a liquid seal will not be formed ordinarily by the liquid in the container 5.

The container 5 may become completely filled with liquid and the liquid may seal the conduit 4 and the vent 16, under extraordinary conditions. At such times the liquid seal prevents vapor from escaping from the tanks 1, and air from entering, through conduit 4, to relieve the pressure or vacuum in the tanks. For safety, the valves 2 are provided to operate under such conditions. The valves 2 are adjusted to operate only when the pressure or vacuum within the vapor space of the tanks 1 becomes excessive. The valves 2 usually are set to operate when the pressure in the vapor space becomes from two to sixteen ounces greater than atmospheric pressure, or less than from one to two ounces of vacuum. Ordinarily, fluctuations in pressure or vacuum in the vapor space are relieved by flow of vapor and air through the conduit 4, the valves 2 remaining closed.

A refrigerating means 8, in all respects like that indicated at 7, may be provided for the vent 16. The means 8 operates to condense any vapors passing out of the container 5 and to return the condensate to the container. The baffling means, such as a screw 14, operates to retard pressure fluctuations and to insure a moderate and steady flow of air through the vent pipe.

When liquid is withdrawn from the storage tanks 1, and when the tanks cool off at night, the reduced pressure within the tanks is relieved by air entering through vent 16, passing through container 5, and flowing into the storage tanks through the conduit 4. When vapor is discharging from the tanks 1, the air carried with it passes into the container 5 and escapes through vent 16. If desired, the valves 2 may be set so as to open when a very slight vacuum develops in the vapor space of the tanks 1, so that air may enter the tanks without passing through the container 5. Thus breathing of the storage tanks 1 is effected.

While two refrigerating means 7 and 8 are shown, they may be considered together as constituting a single refrigerating means; alternatively, either means 7 or 8 may be used effectively alone as the refrigerating means.

Condensate may be withdrawn from the container 5 through the pump line 19 by attaching any suitable pumping means therewith.

Another form of the invention is illustrated in Figure 3. As shown in that figure, the subterranean (or submerged) container 5, connected with storage tanks (not shown) by a conduit 4, vented to the atmosphere through a vent 16, and provided with a pump line 19, are like the same elements illustrated in Figure 1. Figure 3 illustrates a refrigerating means different from that of Figure 1. The essential difference between the two is in the manner in which heat transfer, for cooling the vapor, is effected. While, in the form of the invention illustrated in Figure 1, the heat transfer takes place by conduction, and at the conduit entering, or the conduit leaving, or both the conduit entering and the conduit leaving, the container 5; heat transfer by conduction plays no part in the device illustrated in Figure 3. This invention is not confined either to any particular mode of heat transfer nor to any particular location and arrangement relative to the container 5 at which heat transfer takes place.

In the form of the invention illustrated in Figure 3, the heat transfer for cooling the vapor takes place within the container 5 and the mode of heat transfer is by mixture of refrigerant, such as cold air, with the vapor. The supply of refrigerant, or cold air, is provided by the air cooling unit, which may be of conventional design and construction, indicated generally at 20. The mechanical refrigerating unit 21 supplies refrigerating fluid to a cooling coil 22 within an air tunnel 23. A replaceable filter 24 is arranged in the tunnel to remove dust and dirt from air entering the tunnel. A fan and motor unit 25 is arranged at the end of the tunnel and operates to draw air through the filter 24, over the cooling coil 22, and to blow the cold air through pipe 26 into the space within the container 5. The pipe 26 extends into the upper part of the container 5 and opens, or has openings therein, near to the top of the container. The refrigerant, or cold air, mixes with the vapor present in the container 5 and cools and condenses the vapor. The air discharges from the container 5 through the vent 16.

While certain forms of refrigerating means have been disclosed by way of illustration it is not intended so to limit the invention. It will be apparent to one skilled in the art that the refrigerating means may take other forms and be arranged differently. For example, a cooling coil of a mechanical refrigerating system may be arranged within the container 5. Many variations in the details of the invention may be made without departing from the spirit and scope of the invention as defined in the following claims.

What I claim as my invention is as follows:

1. In combination with a storage tank for petroleum products, a vapor recovery system comprising: a subterranean container, a conduit for conducting vapor from the tank to the container, a vent to the atmosphere from the container, said conduit and vent being so arranged as to permit flow of gases from or into said storage tank through the container and vent, refrigerating means arranged in heat transfer relation to the conduit, the container, and the vent for cooling the vapor, the condensate being collected and retained in the container.

2. In combination with a storage tank for petroleum products, a vapor recovery system comprising: a subterranean container, a conduit for conducting vapor from the tank to the container, a vent to the atmosphere from the container, said conduit and vent being so arranged as to permit flow of gases from or into said storage tank through the container and vent, refrigerating means in heat transfer relation with the container and the vent.

3. In combination with a storage tank for petroleum products, a vapor recovery system comprising: a subterranean container, a conduit for conducting vapor from the tank to the container, a vent to the atmosphere from the container, said conduit and vent being so arranged as to permit flow of gases from or into said storage tank through the container and vent, refrigerating means in heat transfer relation to fluid in the container.

4. In combination with a storage tank for petroleum products, a vapor recovery system comprising: a subterranean container, a conduit for conducting vapor from the tank to the container, a vent to the atmosphere from the container, said conduit and vent being so arranged as to permit flow of gases from or into said storage tank through the container and vent, means for introducing a refrigerant into the container in contact with vapor.

5. In combination with a storage tank for petroleum products, a vapor recovery system comprising: a subterranean container, a conduit for conducting vapor from the tank to the container, a vent to the atmosphere from the container, said conduit and vent being so arranged as to permit flow of gases from or into said storage tank through the container and vent, means including a refrigerating element associated with the vent in heat transfer relation to vapor passing through the vent.

6. In combination with a storage tank for petroleum products, a vapor recovery system comprising: a subterranean container, a conduit for conducting vapor from the tank to the container, a vent to the atmosphere from the container, said conduit and vent being so arranged as to permit flow of gases from or into said storage tank through the container and vent, refrigerating means associated with the conduit and with the vent in heat transfer relation to vapor passing through the conduit and vent.

7. In combination with a storage tank for petroleum products, a vapor recovery system comprising: a subterranean container, a conduit for conducting vapor from the tank to the container, a vent to the atmosphere from the container, said conduit and vent being so arranged as to permit flow of gases from or into said storage tank through the container and vent, and means for supplying cold air to the container.

8. In combination with a storage tank for petroleum products, a vapor recovery system comprising a subterranean container, a conduit for conducting vapor from the tank to the container, a vent for the container, refrigeration means associated with the vent, said conduit and vent being so arranged that vapors escaping from the tank pass into the container and through the vent in heat transfer relation to the refrigerating means.

KENNETH S. CLAPP.